United States Patent

Albertson

[15] 3,698,256
[45] Oct. 17, 1972

[54] TRANSMISSION BELT-DRIVE SYSTEM
[72] Inventor: Robert V. Albertson, 2100 Shady Wood Road, Wayzata, Minn. 55391
[22] Filed: May 13, 1970
[21] Appl. No.: 36,776

[52] U.S. Cl ................................. 74/230.17 E, 74/230.17 F, 74/230.17 M
[51] Int. Cl ................................. F16h 55/22
[58] Field of Search .......... 74/217 CV, 230.17 E, 74/230.17 M, 230.17 F, 230.17 C

[56] References Cited

UNITED STATES PATENTS

| | | |
|---|---|---|
| 3,280,649 | 10/1966 | Bruet .................. 74/230.17 F |
| 3,557,640 | 1/1971 | Hendriks et al. ..... 74/230.17 F |
| 3,110,189 | 11/1963 | Steuer .................. 74/230.17 F |
| 2,611,464 | 9/1952 | Rabe .................... 74/230.17 C |
| 2,173,661 | 9/1939 | Perrine ................ 74/217 CV |
| 3,224,287 | 12/1965 | Gesche et al. ....... 74/230.17 M |
| 3,266,330 | 8/1966 | Galleher .............. 74/230.17 E |
| 3,280,648 | 10/1966 | Nelson ................ 74/230.17 CC |
| 3,534,622 | 10/1970 | Johnson .............. 74/230.17 E |

Primary Examiner—Leonard H. Gerin
Attorney—Alfred E. Hall

[57] ABSTRACT

A transmission belt drive system having an automatic change in ratio of drive-pulley belt diameter to driven-pulley belt diameter with increase in speed of the driven pulley by causing opposing flanges on each pulley to move with respect to each other thereby changing the point on the diameter of each pulley at which the transmission belt operates, a bracket rigidly attached to the driving pulley and a drive belt ratio locking device mounted in the bracket for selectively limiting the distance the drive-pulley flanges can move with respect to each other thereby maintaining a constant drive belt ratio regardless of the speed which the drive pulley is rotated.

5 Claims, 13 Drawing Figures

PATENTED OCT 17 1972  3,698,256

INVENTOR
ROBERT V. ALBERTSON

BY  *Alfred E Hall*

ATTORNEY

INVENTOR
ROBERT V. ALBERTSON

BY  Alfred E. Hall

ATTORNEY

INVENTOR
ROBERT V. ALBERTSON

BY *Alfred E Hall*

ATTORNEY

INVENTOR
ROBERT V. ALBERTSON

BY Alfred E. Hall
ATTORNEY

TRANSMISSION BELT-DRIVE SYSTEM

BACKGROUND OF THE INVENTION

There are in existence today a great many vehicles having a transmission belt driving system. In such a system, there is a driving pulley with a movable and a fixed flange, a driven pulley with a movable and a fixed flange, a transmission belt coupling said driving and driven pulleys, means such as a plurality of cams which are operatively associated with the movable flange of the driving pulley whereby an increase of rotational speed of said driving pulley enables the cams to force the movable flange of the driving pulley closer to the fixed flange thereby causing the transmission belt to operate at a greater distance from the center of the driving pulley. As it does so, the force on the movable flange of the driven pulley causes the movable flange to move away from the fixed flange thereby causing the belt to operate at a smaller distance from the center of the driven pulley. In effect, what happens is that at low rotational speeds of the drive pulley, the fixed and movable flanges of the drive pulley are forced apart by a spring thus enabling the transmission belt to ride near the bottom of the pulley thereby creating a small diameter drive wheel. The flanges of the driven wheel are forced close together by a spring thus causing the transmission belt to operate near the outer edge of the driven-pulley flanges thereby creating a large diameter driven wheel. Therefore, at low speeds a small diameter driving pulley is coupled by the transmission belt to a large diameter driven wheel. This is, in effect, a low gear since it requires many turns of the drive wheel to cause one rotation of the driven wheel. As the rotational speed of the drive wheel increases, cams or other means operatively associated with the movable flange of the drive wheel force the movable flange of the driving pulley closer to the fixed flange thereby causing the transmission belt to move outward on the radius of the driving wheel so as to operate at a greater distance from the center of the driving pulley. The forces on the transmission belt which cause it to move upward along the radius of the driving wheel also cause it to move inwardly along the radius of the driven wheel thus forcing the movable flange of the driven wheel away from its associated fixed flange. Thus higher rotational speeds of the driven wheel cause the transmission belt to effectively form a large diameter driving pulley and a small diameter driven pulley. This is, essentially, a high gear since it enables one complete rotation of the driving wheel to cause several complete rotations of the driven wheel. This means then that such a transmission belt drive system has a built-in capability of effectively switching from a low gear to a higher gear as the rotational speed of the driving wheel is increased.

There is, however, an inherent disadvantage to this type of system wherein the gear ratio is automatically changed with increase in rotational speed of the driving wheel. This disadvantage exists because the gear ratio change can occur at a time when maximum power is needed but minimum power will be generated. Consider, for example, a snowmobile which utilizes the transmission belt drive system. Normally a low gear is needed to get the machine moving but after it has commenced moving and the throttle is advanced, the gear ratio begins to change in order to place the vehicle in a higher gear. This is normal operation and no problem occurs. Assume however that the vehicle is heavily loaded and it is desired to climb a hill with this load or in some other manner increase the load placed upon the vehicle. As soon as the throttle advanced and the engine speed increased, the driving wheel rotational speed is increased and the machine immediately begins to assume a higher gear ratio. Under these conditions, that is when a vehicle is attempting to move a heavy load under increasing load conditions, it is obvious that the change in gear ratio with the increase in rotational speed of the driving wheel when the throttle is advanced is precisely the wrong event to occur. That is, at this time a greater power is needed at the driven wheel and yet the reverse occurs.

There is a need, therefore, for a device which will overcome the prior art objections and allow the driving system to remain in "low gear" even though the throttles are advanced and the rotational speed of the driving wheel increases.

SUMMARY

In the preferred embodiment, the present invention overcomes the disadvantages of the prior art drive systems by enabling the system to remain in "low gear" even though the throttles may be advanced and the rotational speed of the drive wheel increased. This is accomplished by preventing the movable flange of the drive wheel from moving toward the associated fixed flange with an increase in rotational speed of the drive wheel. Thus means are provided which override the action of the cam weights or other devices which tend to cause the movable flange of the drive wheel to move toward the fixed flange with an increase in rotational speed of the drive wheel.

In the preferred embodiment a hydraulic system is used to force a piston which is mounted in a bracket attached to the movable flange against a stationary element. The hydraulic fluid can be metered in amounts sufficient to move the piston to any desired position therefore controlling the point at which the piston comes in contact with the stationary element and therefore controlling the amount of movement the movable flange can take towards the fixed flange of the drive wheel.

In the event a more simple system is desired, the piston can be in the form of a lag screw having steep pitch threads and which has a handle on one end whereby movement of the handle will cause the screw to move in towards or away from the stationary element. Again of course the lag screw must be mounted in a bracket which is attached to the movable flange of the drive wheel.

Thus it is an object of the present invention to provide a device which will enable a transmission belt drive system to remain in "low gear" even though the rotational speed of the drive wheel is increased.

It is a further object of the present invention to provide a transmission belt drive system having an automatic change in ration of drive-pulley belt diameter to driven-pulley belt diameter with increase in speed of the driven pulley by causing opposite flanges on each pulley to move with respect to each other thereby changing the point on the diameter of each pulley at which the transmission belt operates and having a drive belt ratio locking device which prevents the change in ratio even though there is an increase in speed of the driven pulley.

It is still another object of the present invention to provide a transmission belt drive system having an automatic change in ratio of drive-pulley belt diameter to driven-pulley belt diameter with increase in speed of the driven pulley by causing opposing flanges on each pulley to move with respect of each other thereby changing the point on the diameter of each pulley at which the transmission belt operates and having a bracket rigidly attached to the driving pulley with means mounted in the bracket for selectively limiting the distance the drive pulley flanges can move with respect to each other.

It is yet another object of the present invention to provide a transmission belt drive system having a hydraulically operated piston which selectively limits the distance the drive pulley flanges can move with respect to each other and therefore which can selectively control the amount of torque applied to the driven wheel at any given RPM of the driving wheel.

It is still a further object of the present invention to provide a transmission belt drive system having a manually operated piston attached to the driving pulley for selectively limiting the distance the drive pulley flanges can move with respect to each other and therefore effectively control the amount of torque which can be applied to the driven wheel at any given RPM.

BRIEF DESCRIPTION OF THE DRAWINGS

These and other more detailed specific objectives will be disclosed in the course of the following specification reference being had to the accompanying drawings in which.

DESCRIPTION OF THE PREFERRED EMBODIMENT

Figure 1:
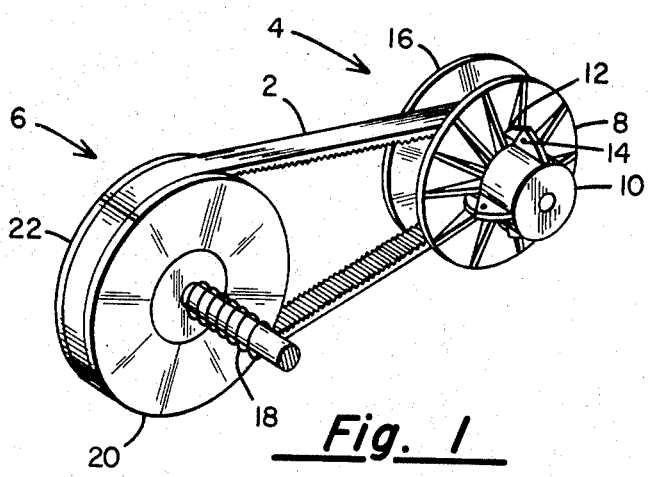
FIG. 1 discloses a basic transmission belt drive system including a driving pulley, a driven pulley, and a belt coupling the two pulleys.

In the present state of the art, transmission belt driving systems have a driving pulley with a movable and a fixed flange, a driven pulley with a movable and a fixed flange, a transmission belt coupling the driving and driven pulleys, a plurality of cams or other devices operatively associated with the movable flange of the driving pulley whereby an increase of rotational speed of the driving pulley enables the cams to force the movable flange of the driving pulley closer to the fixed flange thereby causing the transmission belt to operate at a greater distance from the center of the driving pulley and simultaneously at a lesser distance from the center of the driven pulley. This arrangement allows the ratio of the drive pulley belt diameter to the driven pulley belt diameter to change with an increase in speed of the driven pulley and therefore cause the system to shift from "a low gear" to "a high gear". Thus the system begins with a small drive wheel operatively coupled to a large diameter driven wheel with a drive belt and, as the rotational speed of the drive wheel increases, the diameter of the drive wheel begins to increase and the diameter of the driven wheel begins to decrease. This causes an effective shifting of gears from "a low gear" to "a high gear". Such a transmission belt drive system is shown in FIG. 1 wherein transmission belt 2 couples drive wheel 4 with driven wheel 6. Flange 8 of drive wheel 4 is movable and has attached thereto cam holder 10 having cams 12 pivotally attached thereto where, when the rotational speed of the drive wheel 4 increases, centrifrical force acting on cams 12 cause them to pivot about points 14 and thereby force movable flange 8 towards fixed drive flange 16. Also shown associated with driven wheel 6 is spring 18 which forces movable flange 20 towards fixed flange 22 of driven wheel 6. Thus as can be seen in FIG. 1, at low rotational speeds of the drive wheel, the transmission belt 2 is forced to the outer radius of driven wheel 6 and rests at the inner radius of drive wheel 4.

Figure 2:
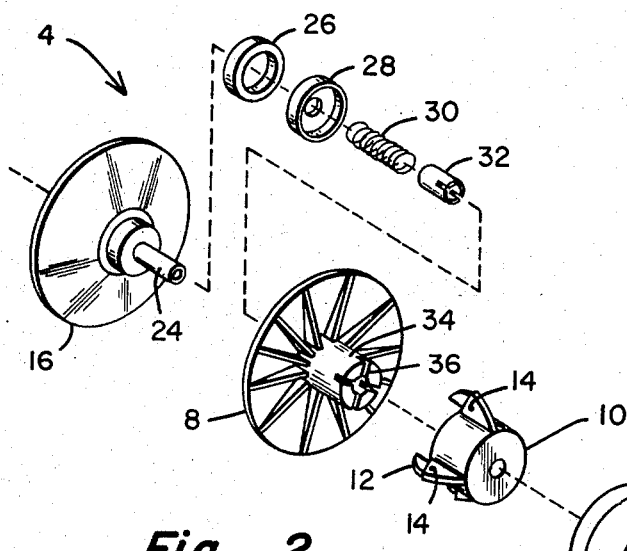
FIG. 2 is an exploded view of the driving wheel showing the component parts thereof.

FIG. 2 is an exploded view of the drive wheel 4 showing the details thereof. Where possible in FIG. 2, like numerals have been used to indicate like components previously described. Fixed drive flange 16 has integrally formed therewith shaft 24 on which rests drive belt roller 26, spring retainer 28, spring 30 and hub bearing 32. Movable drive flange 8 rides on hub bearing 32. Also integrally formed with movable drive flange 8 is hub 34 having slot 36 therein. Cam holder 4 fits over hub 34 with cams 12 having the rear portions thereof not shown resting in slots 36. A drive wheel cover 38 having slots 40 therein, may be used in place of cam holder 4. If cover 38 is used in place of cam holder 10, the cams 12 are attached in a manner not shown to the inside of cover 38, such that the rear portion of the cams protrude from slots 40 in cover 38. In any event, bolt 42 is used to attach all of the components of the drive wheel to the power source.

Figure 3A:
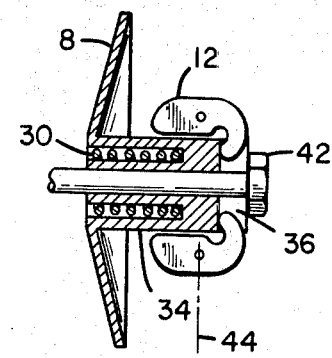
FIG. 3a and FIG. 3b illustrate how the movable flange of the drive wheel is forced towards the stationary flange of the drive wheel under the influence of the cams with an increase of rotational speed of the drive wheel.
Figure 3B:
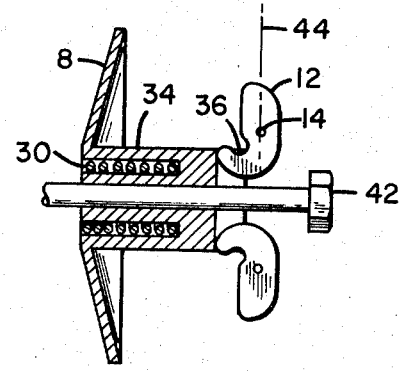

FIG. 3a and 3b use a common center line 44 passing through the pivot points 14 of cams 12 to illustrate how centrifical force causes cam action which tends to move the movable flange 8 towards the fixed flange 16 shown in FIG. 2. In FIG. 3a, representing the movable flange of the drive wheel at low rpms, spring 30 tends to force movable flange 8 and hub 34 away from fixed flange 16 not shown in FIG. 3a but shown in FIG. 2. FIG. 3b illustrates a high rpm condition in which cams 12 have been pivoted about rotational points 14 thereby causing the rear portion of cams 12 resting in slots 36 to force hub 34 and attached flange 8 against spring 30 in a direction towards the fixed flange 16 not shown in FIG. 3B but shown in FIG. 2. It will be noted that bolt 42 which is used to attach the drive wheel assembly to the power source is fixed and does not change its position. This is important to the understanding of the invention as will be described subsequently.

Figure 4A:
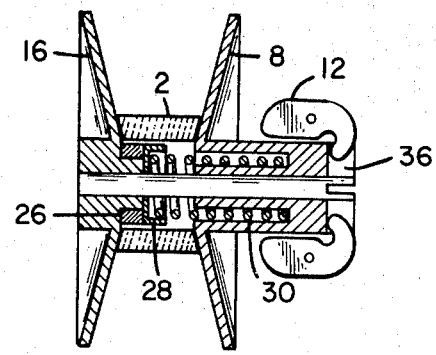
FIG. 4a and FIG. 4b illustrate how the drive belt is caused to move outwardly along the radius of the drive wheel as the movable flange is caused to move toward the stationary flange under the influence of the cams with an increase in rotational speed of the drive wheel.
Figure 4B:
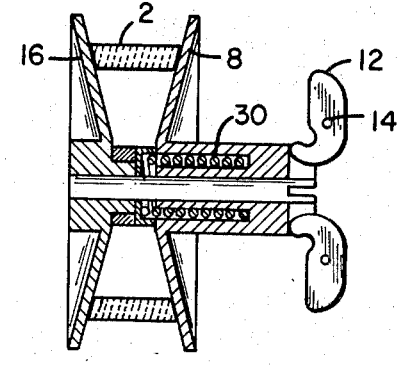

FIG. 4a and FIG. 4b show the assembled drive wheel with drive belt 2 positioned therein at both low rpms and high rpms. It will be seen in FIG. 4a that at low rpm, cams 12 have not pivoted outwardly and spring 30 therefore forces movable flange 8 away from fixed flange 16 allowing the drive belt 2 to rest on drive belt roller 26 at the bottom of the slot formed by movable flange 8 and fixed flange 16 therefore forming a drive wheel of small radius.

However, as can be seen in FIG. 4b, at high rpm, cams 12 pivot outwardly about their axis 14, thereby causing movable flange 8 to overcome the spring tension of spring 30 and move towards fixed flange 16. The bottom of the slot formed by movable flange 8 and fixed flange 16 is now too narrow for drive belt 2 which rides upwardly in the slot toward the outer periphery of the flanges of the drive wheel therefore effectively forming a large radius drive wheel. Thus it can be seen from FIGS. 4a and 4b that, depending upon the rpm of the drive wheel, drive belt 2 effectively forms either a small diameter drive pulley or a large diameter drive pulley. As explained previously, this is in effect, a capability of changing from a low gear to a high gear with a change in rpm of the drive wheel.

Figure 5:
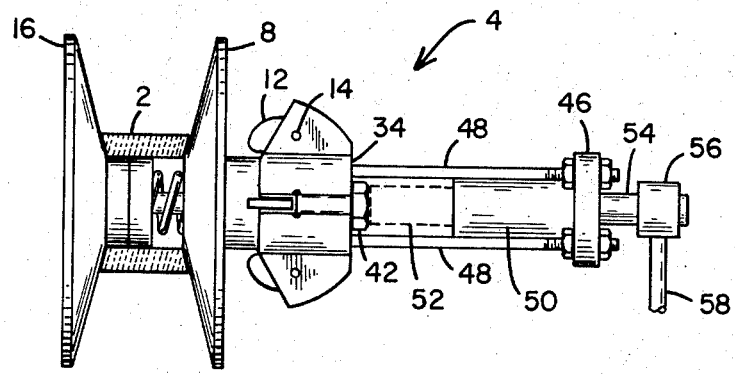
FIG. 5 illustrates the drive wheel with the present invention attached to the movable flange thereof with the drive belt shown in the position of low RPM or also in the position of high RPM if the piston assembly of the present invention is extended as shown in the dotted lines.

FIG. 5 discloses the drive wheel 4 with the present invention attached thereto for preventing the drive belt 2 from changing position even with an increase in rpm of the drive wheel therefore preventing a change of low gear to high gear. The invention consists of a bracket 46 rigidly attached to hub 34 of drive pulley 4 by means of bolts 48. Mounted in said bracket 46 is a hydraulic unit comprising body 50 having therein movable piston 52 which is shown in dotted lines in the extended position. Body 50 has neck 54 protruding therefrom and about which is mounted universal input 56 for the purpose of enabling hydraulic fluid in hydraulic line 58 to enter body 50 and force piston 52 to an extended position. The details of universal input 56 will be discussed with reference to FIG. 7.

FIG. 5 illustrates the same condition of drive wheel 4 as that shown in FIG. 4a. That is, the wheel is turning at a low rpm and drive belt 2 is positioned at the bottom of the slot formed by movable flange 8 and fixed flange 16.

Figure 6:
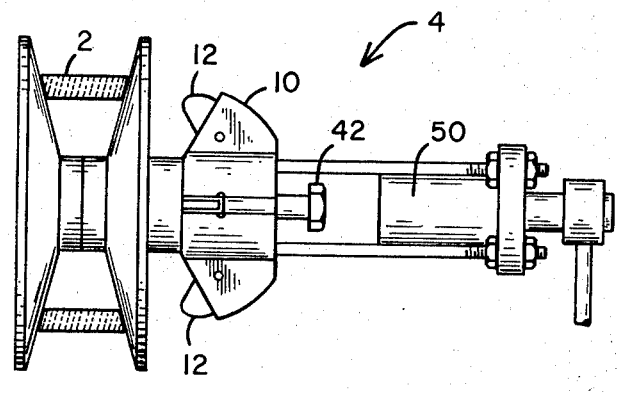
FIG. 6 illustrates the drive wheel with the present invention attached to the movable flange thereof with the belt shown in a position of high RPM and the piston of the present invention not being activated.

FIG. 6 shows the drive wheel 4 with the present invention attached but not operative and rotating at a high rpm. It will be noted that cams 12 are in their pivoted position indicating that the wheel is turning at a high rpm and that drive belt 2 is in a position towards the outer periphery of the drive wheel thereby forming a large diameter drive wheel. Note that cam holder 10 has moved away from the head of bolt 42 and that body 50 of the hydraulic unit has moved toward the head of bolt 42.

Returning now to FIG. 5 and assuming that the drive wheel 4 is turning at a low rpm, if it is desired to keep drive belt 2 in the position shown in FIG. 5 even though the rpm of the drive wheel are increased, hydraulic fluid under pressure is allowed to enter through hydraulic line 58 and universal input 56 to the body 50 where piston 52 is extended to the position shown by the dotted lines. Now, with an increase in rpm of the drive wheel, cams 12 tend to pivot about points 14 and move in an outwardly direction. However they cannot do so because of head of bolt 42 is resting against piston 52 thus preventing cam holder 10 from moving with movable flange 8 towards stationary flange 16. Piston 52 has therefore effectively locked drive wheel 4 in a low gear condition since belt 2 can continue to operate at the position shown near the bottom of the slot formed by movable flange 8 and fixed flange 16. It can be seen therefore that regardless of the rpm at which the drive wheel is driven, movable flange 8 cannot move towards fixed flange 16 and, therefore, drive wheel 4 is held in a low gear condition.

Figure 7:
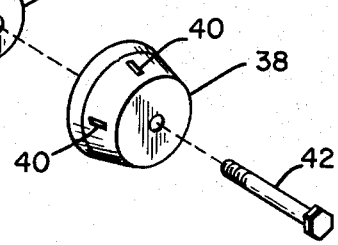
FIG. 7 is a cross sectional view of the hydraulic actuator of the present invention.

The details of the hydraulic unit are shown in FIG. 7. Body 50 has therein piston 52 which is spring loaded to the inner or non-extended position. Spring 60 rests between body 50 and face 62 of piston 52 and holds the piston in the inner or nonextended position. Seals 64 prevent any hydraulic fluid from escaping when the piston is extended. Collar 66 may be integrally formed with body 50 and has therein holes 68 which enable the hydraulic unit to be attached to bracket 46 shown in FIG. 5. Neck 54 has formed therein a passageway 70 which is connected to chamber 72. Orifice 74 in the wall of neck 54 communicates with the passageway 70 to allow hydraulic fluid entering therein to pressurize chamber 72 and force piston 52 against spring 60 and extend it from body 50. Universal input 56 is rotatably mounted on neck 54 and has therein a chamber 76 which is always in fluid communication with orifice 74. The external hydraulic source may be connected to orifice 78 in universal input 56 to enable hydraulic fluid to fill chamber 76, pass through orifice 74 and neck 54 and communicate with chamber 72 and provide a force against piston face 62 to extend it from body 50. Seals 80 prevent any hydraulic fluid from leaking between universal input 56 and neck 54. Spring clips 82 or other well known means are used to rotatably fasten universal input 56 to neck 54.

Figure 8A:
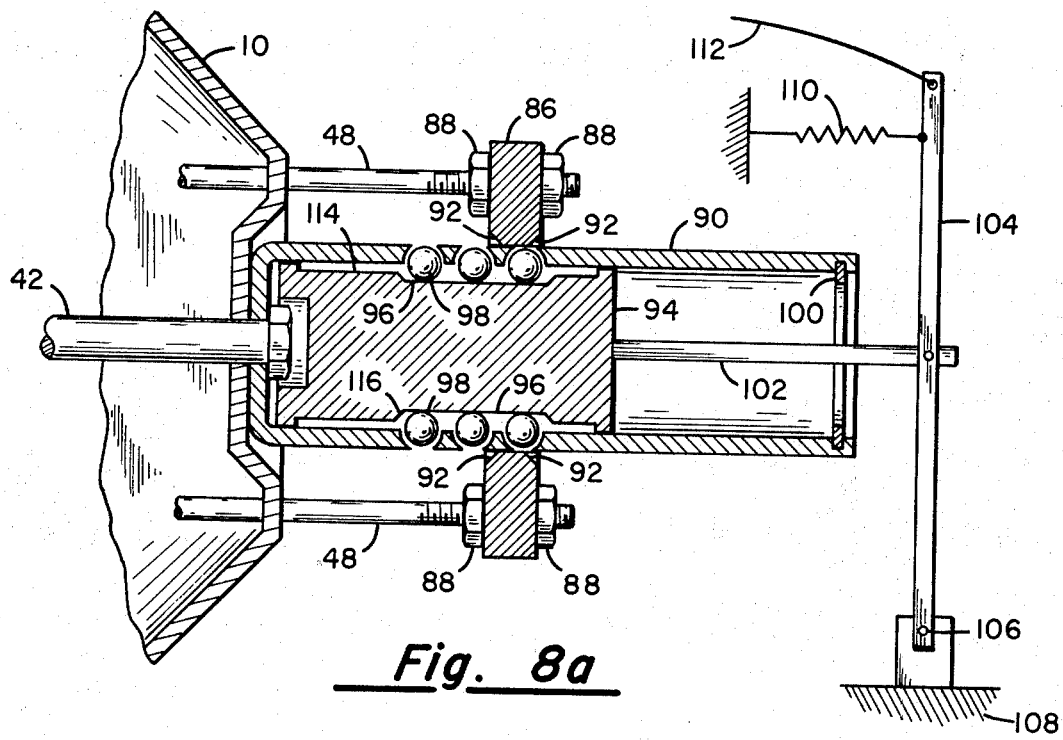
FIG. 8a illustrates the mechanically operated piston attached to the movable flange of the drive wheel.
Figure 8B:
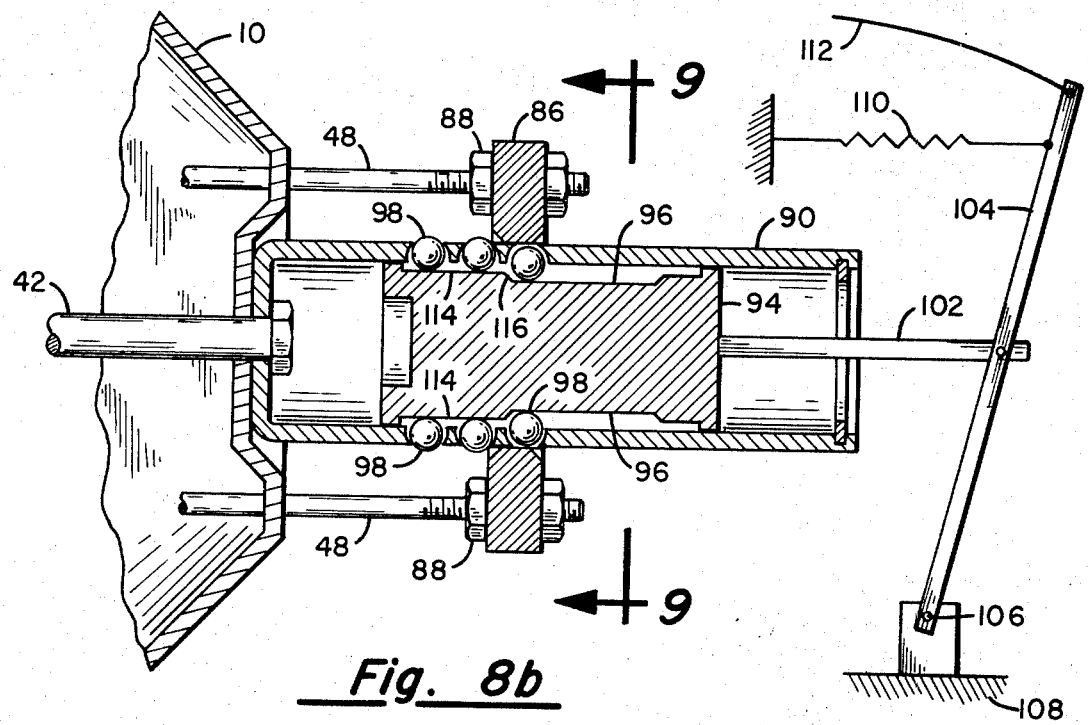
FIG. 8b illustrates the mechanical piston in a second position.

Obviously, in place of the more expensive hydraulically activated unit, a simple but effective mechanical device such as that shown in FIG. 8a and FIG. 8b can be used.

As shown in FIG. 8a, the device comprises a bracket formed by bolts 48, which extend from hub 34 through cam holder 10 as described with reference to the previous embodiment, and collar 86 which is attached to bolts 48 by any suitable means such as nuts 88. Collar 86 extends completely around cylindrical changer 90 (see FIG. 9) and is essentially rectangular in cross-section except for bevelled edges 92 the purpose of which will be explained in more detail later. Cylindrical chamber 90 is attached to cam holder 10 by bolt 42 which passes through the cam holder 10, movable drive flange 8 and shaft 24 of fixed drive flange 16 as shown in FIG. 2 and described previously. Movable piston 94 is slidably mounted within cylindrical chamber 90 and has detents 96 which enable ball bearings 98 to rest therein. Snap-ring 100 prevents piston 94 from moving out of chamber 90. Attached in any well known manner to the end of piston 94 facing the open end of chamber 90 is an arm 102 which passes through the open end of chamber 90 and is attached to control rod 104 which in turn, is pivotally attached to the vehicle frame 108 at point 106. Rod 104 is biased towards the position shown by spring 110.

In the position shown, normal change in ratio of drive belt pulley diameter to driven belt pulley diameter with increase in speed of the driven pulley occurs. Thus, when the rotational speed of the drive pulley increases, the movable flange 8, in FIG. 2, begins to move towards fixed flange 16. Since hub 34, FIG. 2, is part of movable flange 8 and has attached thereto bolts 48, collar 86 moves freely in the same direction.

Suppose now that it is desired to selectively limit the distance the drive pulley flanges can move with respect to each other thereby selectively locking the ratio of the drive belt diameter to the driven belt diameter. First, the engine speed is reduced to idle so that the fixed and movable flanges can separate as far as possible thus allowing collar 86 to move outwardly on chamber 90 until it is positioned beyond the outermost ball bearing 98. By utilizing a lever operated cable 112 which is well known in the art and attached to the upper end of rod 104, the bias tension of spring 110 can be overcome and rod 104 pivots outwardly about point 106 as shown in FIG. 8b thereby pulling piston 94 towards the open end of chamber 90. As the bevelled end 116 of shoulder 114 of piston 94 comes into contact with ball bearings 98, it forces them up through the openings in the wall of chamber 90 such that they partially protrude through the wall. It can now be seen that shoulder 114 holds the ball bearings 98 in this position. If the collar 86 now tries to move inwardly with an increase in engine speed, the ball bearings 98 protruding through the walls of chamber 90 engage collar 86 and prevent it from moving. The drive belt diameter to driven belt diameter ratio is thus held constant no matter what speed the engine is driven.

Suppose now that a higher ratio is desired. By using cable 112 to pull rod 104 inwardly to the position shown in FIG. 8b, piston 94 moves inwardly and beveled edge 116 of shoulder 114 passes under the first or outermost ball bearing 98 thus allowing it to fall down into detent 96 sufficiently to provide clearance for collar 86 which can now move inwardly until it makes contact with the next ball bearing 98 and is prevented from moving further.

Obviously, if a still higher ratio is desired, rod 104 can be moved further inwardly thus allowing piston 94 to move still further inwardly until the next ball bearing falls into detent 96 sufficiently to allow clearance for collar 86 which now moves up to the next ball bearing. Only three ball bearings are shown in FIG. 8a and FIG. 8b but as many as desired can be used. It will be noted that the orifice in which each ball bearing is located is so shaped as to prevent the bearings from flying out from the orifice.

Figure 9:
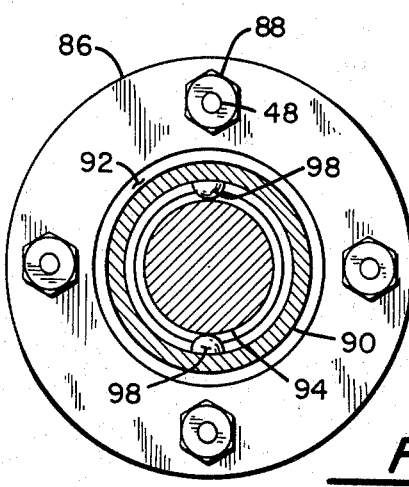
FIG. 9 is a cross-sectional view of the device of FIG. 8.

As stated earlier, FIG. 9 is a cross-sectional view of the device as shown FIG. 8b and illustrates the cylindrical type collar 96 which passes around and is close to the outer surface of chamber 90.

Figure 10:
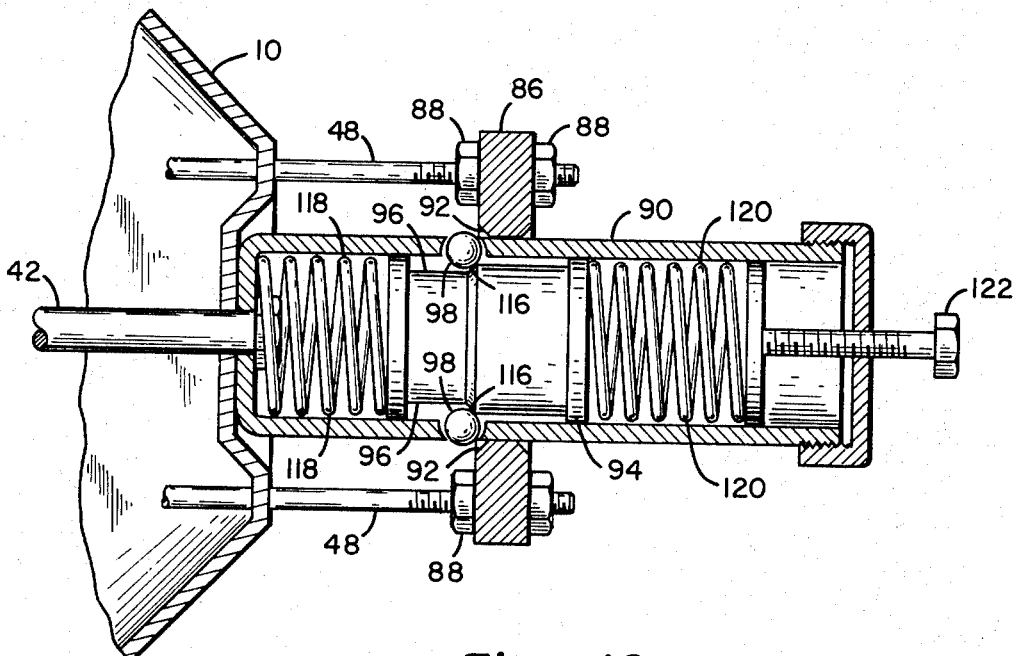
FIG. 10 illustrates an automatic torque sensor utilizing the present invention.

FIG. 10 illustrates a more simple and economical embodiment of the invention and is a torque sensor which limits the drive belt diameter to driven belt diameter ratio to a maximum value until a predetermined drive pulley rotational speed is achieved at which time the limiting device is overcome and the drive belt system works as it normally does without a limiting device. Refer now to FIG. 10 in which like numerals represent like objects in the other FIGURES. Here, piston 94 is balanced between two springs 118 and 120 such that ball bearing 98 rests on the beveled edge 116 of detent 96. In this position, ball bearing 98 protrudes through the wall opening of chamber 90 sufficiently to prevent collar 86 from moving inwardly. As the engine speed increases and a greater force is applied to collar 86, beveled edge 92 applies so much downward pressure on ball bearing 98 that it, in turn, applies a pressure to piston 94 through its beveled edge 116 thus assisting spring 118 in forcing the piston outwardly and enabling ball bearing 98 to drop down into detent 96 sufficiently to allow collar 86 to pass over the ball bearing. Now the engine works in its normal manner and the drive belt ratio from that point on can vary normally. When the engine slows down, the combined force of spring 118 plus the force of collar 86 again forces ball bearing 98 downwardly into detent 96 thus allowing collar 86 to pass back over the ball bearing 98.

It can be seen that the amount of pressure required for collar 86 to overcome ball bearing 98 can be adjusted by turning bolt 122 which compresses or decompresses spring 120 thus requiring more or less pressure, as desired, from collar 86 to force the piston 94 outwardly and allowing the ball bearing 98 to drop down into detent 96.

Thus a very effective drive belt diameter to driven belt diameter ratio locking device has been described in which the ratio can be varied manually from one setting to another or automatically whereby the ratio is limited to a maximum value until the engine rotational speed reaches a predetermined value at which time the ratio can increase to any other setting as it normally functions.

It is understood that suitable modifications may be made in the structure as disclosed provided such modifications come within the spirit and scope of the appended claims.

Having now, therefore, fully illustrated and described by invention, what I claim to be new and desire to protect by Letters Patent is:

1. In a transmission belt drive system having an automatic change in ratio of drive pulley belt diameter to driven pulley belt diameter with increase in rotational speed of the driven pulley by causing opposing flanges on each pulley to move with respect to each other thereby changing the point on the diameter of each pulley at which the drive belt operates, a drive belt ratio locking device comprising:

a. a cylindrical collar substantially rectangular in cross-section and fixed to said bracket, b. a chamber positioned inside said collar and having at least one orifice in the wall thereof, said chamber being attached to said driving pulley, c. a piston slidably mounted inside said chamber and having therein a detent with a beveled edge and d. means cooperating with said collar and said beveled edge of said piston detent for preventing said collar from moving inwardly and e. means coupled to said piston for moving said piston to a position such that said means allows said collar to move inwardly with a change in rotational speed of said drive pulley.

2. A drive belt ratio locking device as in claim 1 wherein said means for preventing said collar from moving inwardly comprises:

a. a ball bearing mounted in said orifice such that said collar is in contact therewith until movement of said piston enables said ball bearing to fall into said detent and disengages said collar and said ball bearing thereby enabling said collar to move freely along said chamber.

3. A drive belt ratio locking device as in claim 2 and further including:

a. a plurality of orifices in said chamber wall, said orifices lying in a straight line parallel to the longitudinal axis thereof, and b. a ball bearing located in each orifice and extending through said wall a distance sufficient to engage said collar, c. said piston having a detent therein sufficient to hold all ball bearings simultaneously whereby selective positioning of said piston allows any number of said ball bearings to rest in said detent thereby disengaging said collar and allowing it to pass over as many ball bearings as are resting in said detent.

4. A torque sensor for a transmission belt drive system having an automatic change in ratio of drive belt pulley diameter to driven belt pulley diameter with increase in rotational speed of the driven pulley by causing opposing flanges on each pulley to move with respect to each other thereby changing the point on the diameter of each pulley at which the drive belt operates, said torque sensor comprising:

a. a bracket rigidly attached to said driving pulley, b. a cylindrical collar substantially rectangular in cross-section and fixed to said bracket, c. a chamber positioned inside said collar and having at least one orifice in the wall thereof, said chamber being attached to said driving pulley, d. a piston slideably mounted inside said chamber and having therein a detent with a beveled edge, and e. means cooperating with said collar and said beveled edge of said piston detent to prevent said collar from moving inwardly beyond said orifice until a predetermined drive pulley rotational speed is reached thereby preventing a change in the ratio of drive pulley belt diameter to driven pulley belt diameter until said predetermined rotational speed is reached.

5. A torque sensor as in claim 4 wherein said means for preventing said collar from moving inwardly comprises:

a. a ball bearing mounted in said orifice, b. a first spring resiliently urging said piston in one direction in said chamber and a second spring resiliently urging said piston in the other direction in said chamber and c. means for adjusting the tension of the second spring such that at a predetermined drive pulley rotational speed, pressure from said collar against said ball bearing will tend to cause the ball bearing to apply pressure to the beveled edge of said piston detent thereby moving the piston in a direction to allow the ball bearing to move down into the detent and enable said collar to pass over the top of the ball bearing.

* * * * *